(12) United States Patent
Kiehn (10) Patent No.: US 10,953,719 B2
(45) Date of Patent: Mar. 23, 2021

(54) REAR AXLE SUSPENSION FOR A VEHICLE

(71) Applicant: Ford Global Technologies, LLC, Dearborn, MI (US)

(72) Inventor: Hagen Kiehn, Pulheim/NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 15/882,149

(22) Filed: Jan. 29, 2018

(65) Prior Publication Data

US 2018/0222277 A1 Aug. 9, 2018

(30) Foreign Application Priority Data

Feb. 6, 2017 (DE) .......................... 102017201811.9

(51) Int. Cl.
  *B60G 21/05* (2006.01)
  *B60G 9/02* (2006.01)
  *B62D 21/11* (2006.01)

(52) U.S. Cl.
  CPC ............. *B60G 21/052* (2013.01); *B60G 9/02* (2013.01); *B62D 21/11* (2013.01);
  (Continued)

(58) Field of Classification Search
  CPC .... B60Y 2306/09; B60G 7/02; B60G 21/052; B60G 9/02; B60G 2204/4102;
  (Continued)

(56) References Cited

U.S. PATENT DOCUMENTS 3,075,786 A * 1/1963 Freers ...................... B60G 3/20
                                                    280/124.15
3,960,388 A * 6/1976 Strader .................. B60G 5/047
                                                    280/86.757
(Continued)

FOREIGN PATENT DOCUMENTS

CN   202727914 U   2/2013
CN   204077275 U   1/2015
(Continued)

OTHER PUBLICATIONS

German Examination Report dated Nov. 22, 2017 re DE 102017201811.9 with computerized English translation.

*Primary Examiner* — Paul N Dickson
*Assistant Examiner* — Timothy Wilhelm
(74) *Attorney, Agent, or Firm* — David Coppiellie; Bejin Bieneman PLC (57) ABSTRACT

A rear axle suspension includes a holder for pivotable connection of a connecting portion of a semirigid axle to a vehicle superstructure. The holder is stationary relative to the vehicle superstructure and has a first and a second holding arrangement for an axle pin. The first and second holding arrangements are arranged on both sides of the connecting portion along a pin axis. In order to provide an optimized connection of a semirigid axle to a vehicle superstructure, the first holding arrangement has a stabilizing element with an arcuate portion. The arcuate portion, in the direction of the pin axis and tangentially, extends at least partially around the pin axis. The axle pin is mounted in the arcuate portion. Fixing portions are adjacent the arcuate portion on both sides and attach the stabilizing element to the vehicle superstructure.

12 Claims, 5 Drawing Sheets

(52) U.S. Cl.
CPC .. *B60G 2200/21* (2013.01); *B60G 2204/1434* (2013.01); *B60G 2204/4102* (2013.01); *B60G 2206/601* (2013.01); *B60Y 2306/09* (2013.01)

(58) Field of Classification Search
CPC ........ B60G 2200/21; B60G 2204/1434; B60G 2206/601; B60G 21/0551; B60G 2200/20; B60G 2202/135; B62D 21/11
See application file for complete search history.

(56) References Cited

U.S. PATENT DOCUMENTS

| | | | | |
|---|---|---|---|---|
| 4,537,420 | A * | 8/1985 | Ito | B60G 3/26 280/124.128 |
| 4,903,791 | A * | 2/1990 | Cameron | B60K 17/34 180/233 |
| 5,246,248 | A * | 9/1993 | Ferguson | B60G 21/051 267/141.3 |
| 6,085,856 | A * | 7/2000 | Law | B60G 21/0551 180/291 |
| 7,144,031 | B2 * | 12/2006 | Fenton | B60G 5/00 280/682 |
| 7,350,795 | B2 * | 4/2008 | Svartz | B60G 7/02 280/124.128 |
| 7,360,756 | B2 * | 4/2008 | Urquidi | B60G 7/02 267/140.14 |
| 7,896,370 | B2 * | 3/2011 | An | B62D 21/02 180/311 |
| 8,292,313 | B2 * | 10/2012 | Pierce | B60G 9/003 280/124.11 |
| 8,590,910 | B2 * | 11/2013 | Suzuki | B60G 3/12 180/311 |
| 9,567,009 | B2 * | 2/2017 | Asano | B62D 21/11 |
| 2006/0220638 | A1 * | 10/2006 | Urquidi | B60G 7/02 324/207.25 |

FOREIGN PATENT DOCUMENTS

| | | |
|---|---|---|
| CN | 204736669 U | 11/2015 |
| DE | 102014212950 A1 | 1/2015 |
| JP | 2006168607 A * | 6/2006 |
| JP | 2006168607 A | 6/2006 |
| JP | 2006248842 A | 9/2006 |
| KR | 20080035380 A | 4/2008 |
| KR | 1020080035380 A | 4/2008 |

* cited by examiner

REAR AXLE SUSPENSION FOR A VEHICLE

CROSS-REFERENCE TO RELATED APPLICATION

This application claims priority to and all benefits of German patent application 102017201811.9 filed on Feb. 6, 2017 entitled "Rear Axle Suspension for a Vehicle," the contents of which are hereby incorporated herein by reference in its entirety.

FIELD OF THE DISCLOSURE

The present disclosure includes a rear axle suspension for a vehicle includes a holder for pivotable connection of a connecting portion of a semirigid axle to a vehicle superstructure. The holder is stationary relative to the vehicle superstructure and has a first and a second holding arrangement for an axle pin which are arranged on both sides of the connecting portion along a pin axis.

BACKGROUND

In motor vehicles, widely varying designs of suspension for the wheels of the vehicle are known. In particular, we can distinguish between the independent wheel suspension predominantly used today in cars, and the rigid axle suspension mainly used on the rear axles of trucks. In addition, however, there are so-called semirigid axles in which the wheels provided on both sides of an axle, or their wheel carriers, are connected to two longitudinal control arms that are connected together via a transverse member running in the transverse direction (sometimes called an axle bridge). The latter is formed bend-resistant but torsionally flexible, so that in the manner of a stabilizer, on uneven suspension compression of the longitudinal control arms, it transmits a torque between said arms. Depending on the position of the axle bridge along the longitudinal control arm, we distinguish between a twist-beam axle (axle bridge closer to the superstructure end) and a torsion crank axle (axle bridge on the end remote from the superstructure).

The semirigid axle is connected pivotably to the vehicle superstructure, normally the chassis, via two holders normally arranged symmetrically relative to the vehicle middle. Each holder is connected on one side to the vehicle superstructure and on the other side it forms a receiver for an axle pin, by means of which the semirigid axle is mounted pivotably, e.g., via a rubber-metal bush. The respective axis of the axle pin, i.e. the pin axis, may here, like the pivot axis of the semirigid axle, run parallel to the transverse axis (Y axis) of the vehicle or at an angle thereto. The part of the semirigid axle which is provided for pivotable mounting may be called the connecting portion or bearing portion. It may be formed on one of the longitudinal control arms or on an arm or extension which protrudes from the axle bridge.

The holder may be made of one or more welded sheet metal parts and have two cheek portions, between which the connecting portion is arranged and on which the axle pin is mounted. In front of the pin axis in the direction of travel, the cheek portions are connected together via a connecting portion which serves to create a necessary stiffness in the transverse direction which the cheek portions do not normally possess. The cheek portions and the connecting portion are normally made of a single sheet metal formed part.

Such a design has various disadvantages. Firstly, bearing forces occurring in the transverse direction act primarily on the cheek portions, which only have a limited stiffness and due to the connecting portion can only be stabilized to a certain extent. This leads to undesirable deformation of the cheek portions and hence to a movement of the respective bearing as a whole. Firstly, vibrations occur which are undesirable from NVH aspects. Secondly, premature material fatigue and failure of the holder can occur. The limited stability in the region of the holder also means that the behavior of the semirigid axle on suspension compression can only be controlled to a limited extent. In order to achieve an approximately adequate stiffness in the transverse direction, comparatively a great deal of material must be used for the holder, which leads to a relatively high weight. In addition, the holder must often be arranged at the side next to a tank of the vehicle which, in the event of an accident, must be protected from damage from parts of the semirigid axle or the associated pivot bearing. In order to protect the tank from sharp edges of the holder, often an additional protective body must be provided between the holder and the tank, which further increases the weight. To prevent slipping of the rubber-metal bush (or its inner sleeve) relative to the cheek portions, normally an axle pin of comparatively large diameter is required which is secured with a high tightening torque.

CN 202727914 U describes an assembly which is part of a holder for connection of a twist-beam axle to a longitudinal member of a vehicle. The assembly consists of three sheet metal parts welded together. The part of the holder which receives the actual pivot bearing is not shown, but is connected to the assembly via screw connections.

CN 204077275 U discloses a holder for connection of a twist-beam axle to a longitudinal member which is formed substantially from four sheet metal parts welded together. A main part, on which the pivot bearing of the twist-beam axle is arranged, is formed as a U-shaped profile which extends parallel to the longitudinal member and is attached thereto at its base. Furthermore, three reinforcing plates are welded to the main part. All reinforcing plates are arranged in front of the pivot bearing in the direction of travel.

KR 10 2008 0035380 A discloses a special bearing bush for a longitudinal control arm of a twist-beam axle. The bearing bush has an inner part assigned to the vehicle superstructure and an outer part assigned to the longitudinal control arm, which are connected together via a concentrically interposed rubber part. In order to adapt the rotational stiffness of the bearing bush dynamically, it is provided that the inner part can be pivoted relative to the vehicle superstructure by means of a motor, in order thus to influence the return force generated by the rubber part. The longitudinal control arm is connected to the vehicle superstructure via a holder consisting of a sheet metal part with two cheek portions which are connected by a connecting portion formed above and in front of the pivot axis in the direction of travel.

CN 204736669 U discloses a holder for pivotable mounting of a twist-beam axle on a vehicle superstructure. The holder is formed from a single sheet metal part which is bolted to the vehicle superstructure. Two cheek portions are connected together via a connecting portion arranged below the pivot axis, wherein a fixing portion running approximately parallel to the pivot axis adjoins each cheek portion. All said portions are formed integrally with each other and have a continuous flange on the edge side.

DE 10 2014 212 950 A1 discloses a mounting structure for a twist-beam axle. Here, a side element runs below a rear floor panel in the vehicle longitudinal direction, and a door sill runs on the vehicle outside relative to the side element in the vehicle longitudinal direction. A side connecting element is connected to the rear end of the door sill and attached to the longitudinal control arm. A connecting element reinforcement is joined to the side connecting element to reinforce this. Optionally, a support element may be provided which extends over a lower and a side face of the side element, up to a face of the connecting element reinforcement on the vehicle inner side. This support element, formed as a sheet metal part, is intended to improve the stiffness.

In view of the prior art outlined, the connection of the semirigid axle to a vehicle superstructure leaves room for improvement. This applies in particular to the stabilization against lateral forces and optimization of the weight.

DESCRIPTION OF THE FIGURES

Further advantageous details and effects of the invention are explained in more detail below with reference to the exemplary embodiments shown in the figures. The drawings show.

In the various figures, the same parts always carry the same reference signs so these are usually only described once.

DETAILED DESCRIPTION

This disclosure is based on the object of providing an optimized connection of the semirigid axle to a vehicle superstructure.

It is pointed out that the features and measures listed individually in the description below may be combined with each other in any technically sensible fashion and constitute further embodiments of the invention. The description characterizes and specifies the invention further, in particular in connection with figures.

The rear axle suspension for a vehicle is provided in particular for motor vehicles such as trucks or cars. However, use for a trailer for example is also possible.

The rear axle suspension has a holder for pivotable connection of a connecting portion of a semirigid axle to a vehicle superstructure. Normally, the semirigid axle is mounted on a chassis of the vehicle. The mounting may take place via elastic bearings, e.g. rubber-metal bearings. The semirigid axle may in particular have a torsional portion extending along the Y axis, and two control arm portions connected by the torsional portion and extending along the X axis of the vehicle towards the rear. It may, in particular, be configured as a twist-beam axle. The term "vehicle superstructure" is here used as a collective term for the bodywork, chassis and in some cases a subframe. The twist-beam axle is pivotably connected or mounted on the vehicle superstructure, wherein the corresponding pivot axis runs in the direction of the Y axis (transverse axis). The portion of the semirigid axle arranged on the superstructure side, which serves as the connection, is called the connecting portion. Alternatively, it could be called the bearing portion. Two connecting portions arranged symmetrically on both sides of the vehicle middle, and two corresponding holders are provided. The connecting portion may be formed on a control arm portion or as a portion separate from the control arm portion and protruding from the torsional portion. The holder is stationary relative to the vehicle superstructure.

The holder has a first and second holding arrangement for an axle pin, wherein the holding arrangements are arranged on both sides of the connecting portion along the pivot axis. The pin axis is here defined by the axle pin and corresponds to its longitudinal axis, which is normally its axis of symmetry. The term "along the pivot axis" is here equivalent to "in the direction of extension of the pin axis" and does not necessarily mean that the respective holding arrangement lies precisely on the pivot axis. For the holder, we can thus distinguish between a first and a second holding arrangement which lie opposite each other relative to the connecting portion in the direction of the pin axis. In other words, the connecting portion is arranged between the two holding arrangements. Normally, the holding arrangements are separate from each other, i.e. they are connected together only indirectly via the vehicle superstructure. A direct connection of the holding arrangement is conceivable in the context of the invention, but it is unnecessary from stabilization aspects and not preferred in view of weight saving. The terms "first" and "second" holding arrangement do not imply a physical order, but serve merely for conceptual distinction. The holding arrangements serve to hold or mount the axle pin which defines the pin axis. A head may be formed on the axle pin on one side, and may for example have a hexagonal socket, a hexagonal profile or other carrier profile. Also, the axle pin may at least in portions have a thread with which, e.g., it is bolted to a nut or one of the holding arrangements in order to secure its position. The connecting portion is pivotably mounted on the axle pin, wherein normally a bearing bush is arranged in between, which may be formed for example as a rubber-metal composite bearing.

The first holding arrangement has a stabilizing element with an arcuate portion which, in the direction of the pin axis and tangentially, extends at least partially around this and in which the axle pin is mounted, and fixing portions adjacent thereto on both sides and attached to the vehicle superstructure. The stabilizing element therefore has at least three portions. It is attached to the vehicle superstructure with two fixing portions. The arcuate portion is arranged between these fixing portions. This extends firstly tangentially at least partially around the pin axis, wherein "tangential" means relative to an axial direction defined by the pin axis. Here "at least partially" means that the arcuate portion in cylinder coordinates extends over at least part of the full angular range of 360° about the pivot axis, preferably over at least 180°. This should not however be interpreted to mean that the arcuate portion must run parallel to the tangential direction, i.e. to a certain extent concentric to the pin axis. It could also be said that the pin axis is surrounded at least partially by the arcuate portion. Here, the arcuate portion also extends in the direction of the pin axis.

Purely because of this, the arcuate portion is comparatively stable in particular against axial forces (which act at least partly in the direction of the transverse axis of the vehicle). In other words, in contrast to the cheek portions of the prior art described above which can be deformed relatively easily by such forces, the arcuate portion is structurally stabilized. Since the fixing portions adjoin the arcuate portion on both sides and are also attached to the vehicle superstructure, the stabilizing element as a whole has a higher stability against forces, in particular against those which act in the axial direction or transverse direction of the vehicle. The axle pin is here mounted in the arcuate portion, which means that a bearing or a receiver for the axle pin is formed either by the arcuate portion itself or by a further element arranged therein. Forces between the vehicle superstructure and the semirigid axle, which are transmitted via the axle pin, thus act on the stabilizing element which, as outlined, resists these forces relatively well. It is also noted that at least the arcuate portion is arranged directly in the region of the pin axis, more precisely around this. Therefore as a whole it is not offset laterally to the pin axis, whereby the forces occurring can be better absorbed. To improve the stability, the fixing portions preferably lie flat on the vehicle structure.

Because of the improved stiffness of the stabilizing element, a possible deformation of the holder is minimized, whereby the movement of the semirigid axle can be determined better, which has a positive effect on the driving behavior of the vehicle. Furthermore, fewer vibrations occur, which is advantageous from NVH aspects. Finally, the service life of the entire holder is extended since it is exposed to fewer deformations. Also, the holder can be designed with comparatively less material and therefore lighter, since the stabilizing element improves the stiffness because of its structure and not because of the increased use of material.

The term "arcuate portion" should not be interpreted to mean that the portion must be configured curved or arcuate. The arcuate portion could be formed for example from a series of angled faces which each extend parallel to the pin axis. However, a design curved at least in portions is preferred. In particular, the stabilizing element may be formed omega-shaped in cross-section, wherein the base of the omega is formed by the two fixing portions and the round part lying in between is formed by the arcuate portion. The stabilizing element may in particular be made as a sheet metal part, wherein the arcuate portion is formed, e.g., as a curved sheet metal portion and the fixing portions as angled sheet metal portions. In addition, the stabilizing element may also, e.g., be configured integrally as an extruded profile.

In general, the holder is attached to a vehicle superstructure, wherein it is normally attached to the vehicle chassis. In particular, a fixing may be provided on a longitudinal member. The fixing portions of the stabilizing element may be attached to a lower face, i.e. to a face of the longitudinal member pointing downward.

As already explained above, the designation of two holding arrangements does not imply a physical order. According to one embodiment, the first holding arrangement is arranged on the inside relative to a vehicle middle. This is advantageous in particular if the holder is arranged in the region of the vehicle tank. In this case, in the event of accidents, the vehicle tank must be protected from damage, which can be achieved in particular by a suitable design of the first holding arrangement, as will be explained further below.

It is conceivable that the axle pin is mounted directly in the arcuate portion. Here for example, the arcuate portion may be thickened at least in portions relative to the fixing portions in order to increase its stability further. According to another embodiment, an axle receiver for the axle pin is fixed in the arcuate portion. Here, the axle pin at least in portions is received or mounted in the axle receiver. Such an axle receiver may, e.g., be welded to an inside of the arcuate portion. Corresponding weld seams may, e.g., be arranged on the edges of a contact region between the axle receiver and arcuate portion. In order to be able to provide more weld seams or position these better, the arcuate portion may also have at least one radially continuous recess, e.g., a slot or a window. The weld seam can then be produced on the slot or edge of the window, wherein to a certain extent the welding tool joins the axle receiver and arcuate portion through the corresponding recess. For example, at least one recess may be arranged in front of the pin axis in the longitudinal direction of the vehicle, and another one behind the pin axis. Furthermore, a recess may be arranged below the pin axis in the vertical axis of the vehicle. The axle receiver may completely surround the axle pin in the tangential direction, i.e. be formed in the manner of a ring or tube. The axle receiver has an inner recess for receiving the axle pin. The recess is normally formed as a through opening, but may however also be formed as a blind hole. Normally a single one-piece axle receiver is provided, but it would also be conceivable, e.g., that several axle receivers are arranged in the axial direction.

According to one embodiment, the axle receiver has an internal thread which cooperates with an external thread of the axle pin. In other words, on assembly the axle pin with its external thread is screwed into the internal thread of the axle receiver, whereby it is substantially fixed in the axial direction. In particular, the axle pin may have a head on the second holding arrangement side, and thus have the form of a fixing bolt, e.g., in the embodiment where the first holding arrangement is arranged on the inside relative to the vehicle middle.

In particular if the first holding arrangement is arranged on the outside, the second holding arrangement may have an internal thread which cooperates with an external thread of the axle pin. In this case, the inner recess of the axle receiver of the first holding arrangement may be smooth i.e. without a thread. Here again, as in the embodiment outlined above, it is guaranteed that the axle pin can be screwed in from the outside of the vehicle, which allows inclusion in the conventional assembly process in which the rear axle is only mounted at a later stage of the assembly process after the tank.

According to one embodiment, the stabilizing element is formed as one piece. It may in particular be produced integrally, e.g., from a single sheet metal part as described above. Also, it is conceivable that the stabilizing element is produced from a trimmed extruded profile, wherein in contrast to a sheet metal part, the cross-section of the individual portions (arcuate portion, fixing portions) can be optimized. In addition however, embodiments are also conceivable in which the stabilizing element is composed of two or more parts which are connected together, e.g., by welding. A possible embodiment would be that the arcuate portion and fixing portions are pre-produced as separate parts and welded together. In this way, the dimensions or material properties of the individual portions can be designed more individually.

In order to improve the stability of the first holding arrangement and its connection to the vehicle superstructure, it is advantageous if, on a side facing away from the connecting portion, it has a platform-like first holding element which extends transversely to the pin axis and is connected to a first side face of the vehicle superstructure and at least indirectly to the stabilizing element. Here, the side face points to the side, which means that it either runs vertically or at an angle to the vertical which is less than 90°. Said holding element may in particular be formed as a sheet metal part and be mainly flat or slightly curved or angled. It extends transversely to the pin axis, i.e. in the radial and tangential direction, wherein in general it does not run precisely parallel to the radial-tangential plane. It is connected to a first side face, which in particular may be a side face of the longitudinal member if the above-mentioned connecting portions are connected to a lower face of longitudinal member. Furthermore, it is at least indirectly connected to the stabilizing element and in particular to its arcuate portion. With a direct connection, problems may result with regard to the permitted production tolerances, for which reason the connection may be indirect, e.g., via the above-mentioned axle receiver. The first holding element is here spaced from the stabilizing element. Said connections may in particular be formed by welding. The axle receiver can then be welded on one side to the holding element and on the other side to the stabilizing element. For example, the axle receiver may be formed as a weld nut, to the internal thread of which an external thread of the axle pin is bolted.

It is furthermore advantageous if the first holding arrangement on a side facing towards the connecting portion has a platform-like stop element which extends transversely to the pin axis and forms a stop for a bearing bush. The stop element can again be formed from a sheet metal. The stop element may be arranged adjacent to but spaced from the stabilizing element. Optionally however, it may also be welded to the stabilizing element. For this, the stabilizing element may, e.g., have a stepped flange to which the stop element is welded. Alternatively or additionally, the stop element may be welded to the axle receiver where present. Via the axle receiver, an indirect connection to the stabilizing element may be created. The bearing bush is evidently a bearing bush which sits on the axle pin and is arranged between this and the connecting portion of the semirigid axle. It could also be said that the stop element is interposed in the axial direction between the bearing bush and the stabilizing element and/or the axle receiver. Its function is primarily to restrict an axial movement of the bearing bush. In addition however, it may also contribute to the further structural stabilization of the first holding arrangement. It is understood that the stop element must have a recess through which the axle pin is guided.

According to one embodiment, the stabilizing element, the first holding element and the stop element may be produced integrally, which is preferable for cost reasons. According to an advantageous embodiment, the first holding element and/or the stop element are however produced separately from the stabilizing element. In particular, all three elements may be produced separately from each other. In other words, the corresponding elements are made individually, e.g., from sheet metal and then where necessary connected together, e.g., welded. Embodiments are also conceivable in which parts of one element are made integrally with another element. For example, one connecting portion could be produced integrally with the first holding element, while the arcuate portion constitutes a separately produced part. This is given purely as an example and numerous other possibilities are conceivable within the scope of the invention.

With regard to the embodiment of the second holding arrangement, various possibilities exist. In principle, this could also have a stabilizing element as described above, corresponding to the first holding element. This is however normally unnecessary from stability aspects, and the second holding arrangement can be designed relatively simply with less material. According to an advantageous embodiment, it has a platform-like second holding element which extends transversely to the pin axis and is connected to a second side face of the vehicle superstructure. If the second holding element is arranged on a side face of a longitudinal member, this is usually the side of longitudinal member opposite the first holding element. The second holding element, like the first holding element described above, may be formed from sheet metal, wherein because of its position on the connecting portion side, it may directly face a bearing bush for which it forms a stop. Furthermore, the second holding element may form an abutment for a head of the axle pin. Evidently, it must have a recess through which the axle pin is guided. If an internal thread described above is formed on the second holding arrangement side, for example a threaded nut may be welded to the second holding element which itself is formed as a sheet metal part.

Since a large part of the forces occurring is absorbed by the first holding arrangement and in particular its stabilizing element, the second holding element need not be particularly rigid, in particular in the axial direction, but at least in this direction may be configured flexibly. Thus it may be formed thinner than the first holding element (where present). The flexibility of the second holding element may be utilized in targeted fashion for an improved assembly process. For this, the spacing of the stop element (where present) from the second holding element is set slightly larger than the length of the bearing bush to be inserted, in order to facilitate insertion of the twist-beam axle. When the axle pin is inserted and, e.g., bolted to an internal thread of the axle receiver, a head of the axle pin may exert an axial force on the second holding element which deforms the second holding element in targeted fashion, and clamps the bearing bush between the stop element/axle receiver and the second holding element. Also, a clamping can be achieved if the internal thread is formed on the second holding arrangement side.

Figure 1:
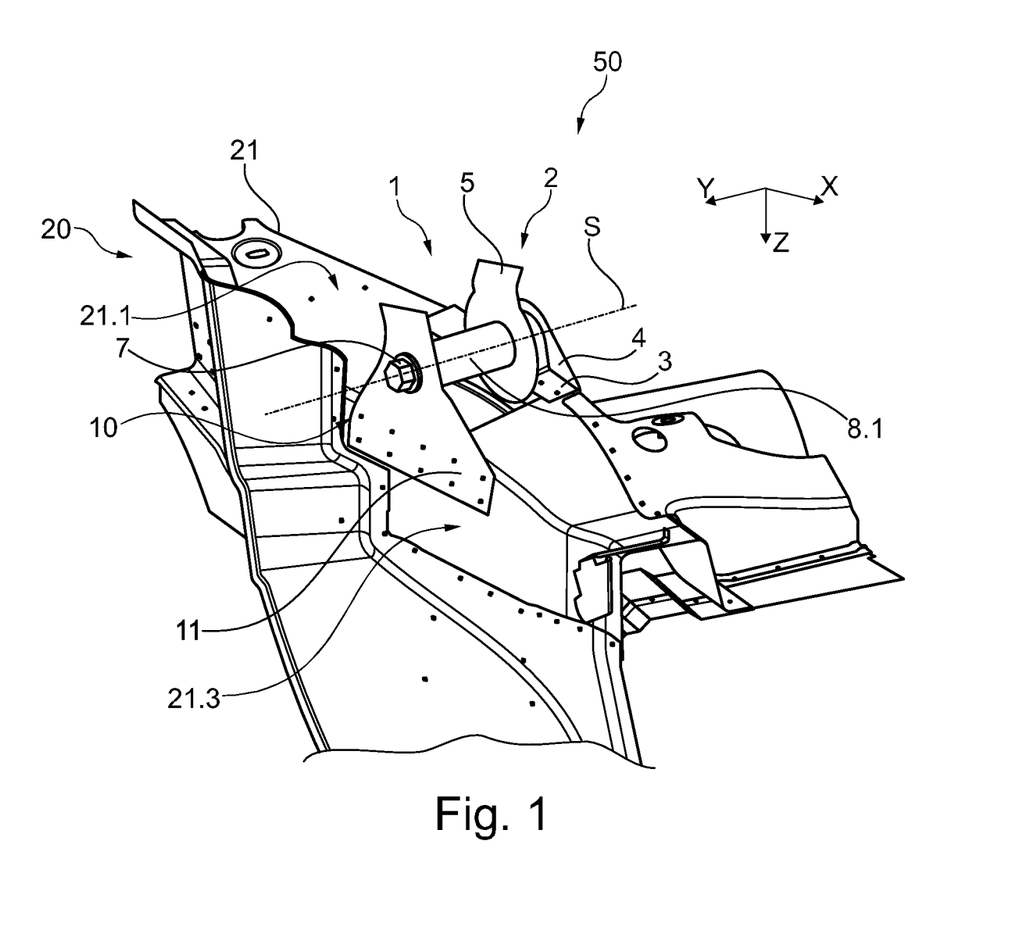
FIG. 1 a perspective depiction of a rear axle suspension according to the invention in a first embodiment.
Figure 2:
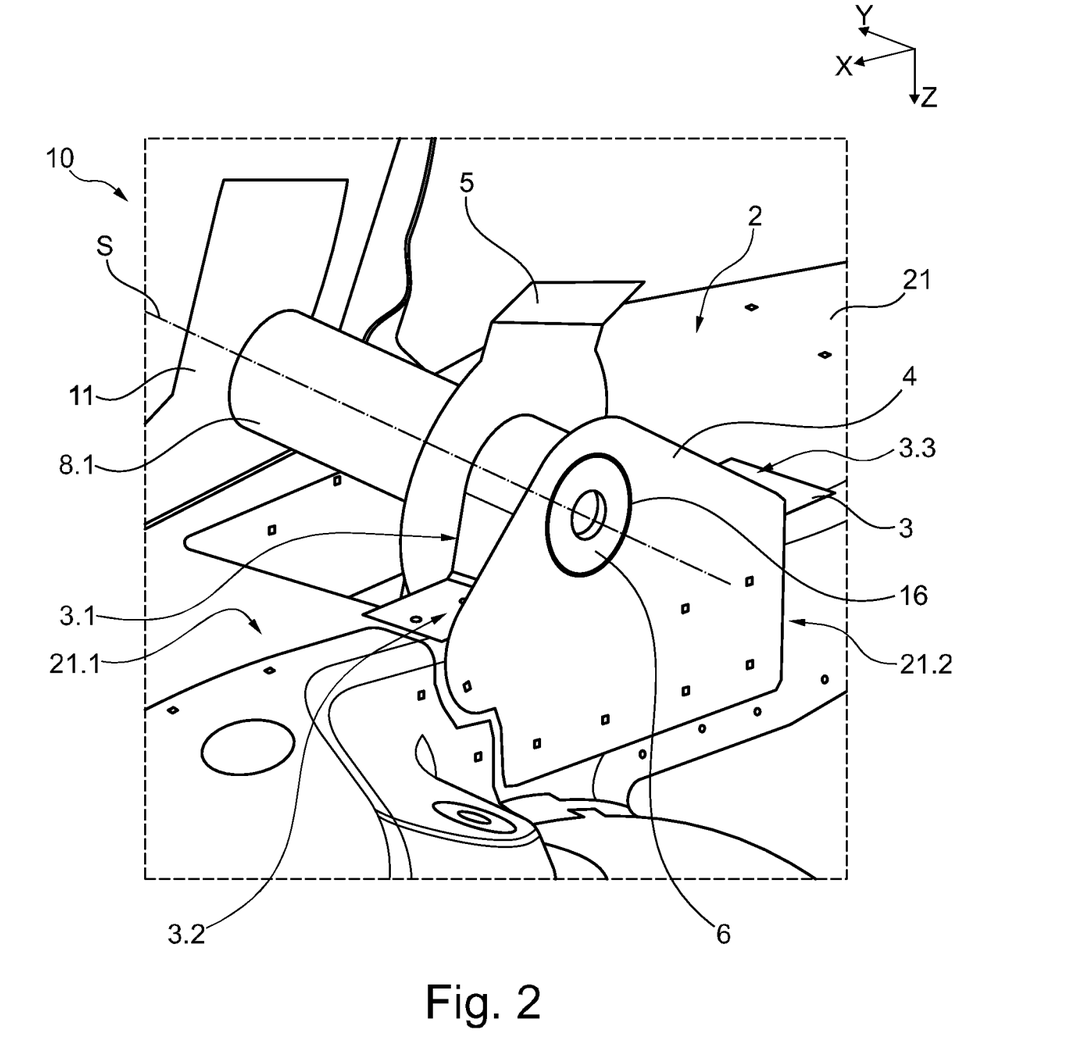
FIG. 2 a further perspective depiction of part of the rear axle suspension from FIG. 1.
Figure 4:
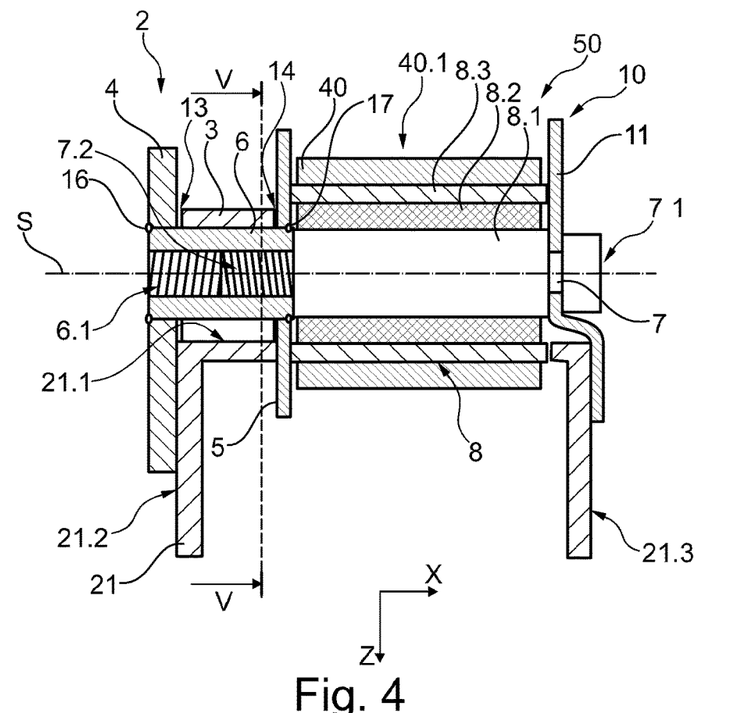
FIG. 4 a simplified, partially sectional depiction of the rear axle suspension from FIG. 1.

FIGS. 1 and 2 show perspective views, each from obliquely below, of a first embodiment of a rear axle suspension 50 according to the invention, in which a twist-beam axle 40 (shown for reasons of clarity only in FIGS. 4 and 5) is connected pivotably by means of two holders 1 to a vehicle superstructure 20. The holders 1 are formed symmetrically relative to the vehicle center axis, so here only one holder 1 is shown. A first holding arrangement 2 and a second holding arrangement 10 are connected to a longitudinal member 21 of the vehicle superstructure 20. The two holding arrangements 2, 10 serve for mounting of an axle pin 7 which, in assembled state, is surrounded by a bearing bush 8, which again is pressed into a recess provided for this of a connecting portion 40.1 of the twist-beam axle 40. As shown from the partial sectional depiction along the Y-Z plane in FIG. 4, the bearing bush 8 is made as a rubber-metal bearing with an inner metal sleeve 8.1, an outer metal sleeve 8.3 and in between a rubber element 8.2. In FIG. 4 and in FIG. 6 to be described below, the axle pin 7 and the inner metal sleeve 8.1 are not cut away. A pin axis S is predefined by the axle pin 7, about which the connecting portion 40.1 is pivotably mounted. The two holding arrangements 2, 10 are arranged on both sides of the connecting portion 40.1 along the pin axis S which defines the axial, radial and tangential direction, or said connecting portion is arranged between them.

The first holding arrangement 2 has a stabilizing element 3 which is welded to a lower face 21.1 of the longitudinal member 21. On a side facing the connecting portion 40.1, a platform-like stop element 5 is arranged which runs mainly inside the radial-tangential plane and is spaced from the stabilizing element 3 by a first gap 13. On the side facing away from the connecting portion 40.1, a platform-like first holding element 4 is arranged, which is welded to a first side face 21.2 of the longitudinal member 21 and spaced from the stabilizing element 3 by a second gap 14. Said elements 3, 4, 5 are in this case formed as sheet metal parts and can therefore be produced at low cost. Alternatively, the stabilizing element 3 could also be produced as an extruded profile. The first holding element 4 and the stop element 5 are welded to an axle receiver 6, which in turn is welded to the stabilizing element 3. The second holding arrangement 10 opposite the first holding arrangement 2 in this exemplary embodiment is formed by a platform-like second holding element 11, which is also formed as a sheet metal part and welded to a second side face 21.3 of the longitudinal member 21.

Figure 3:
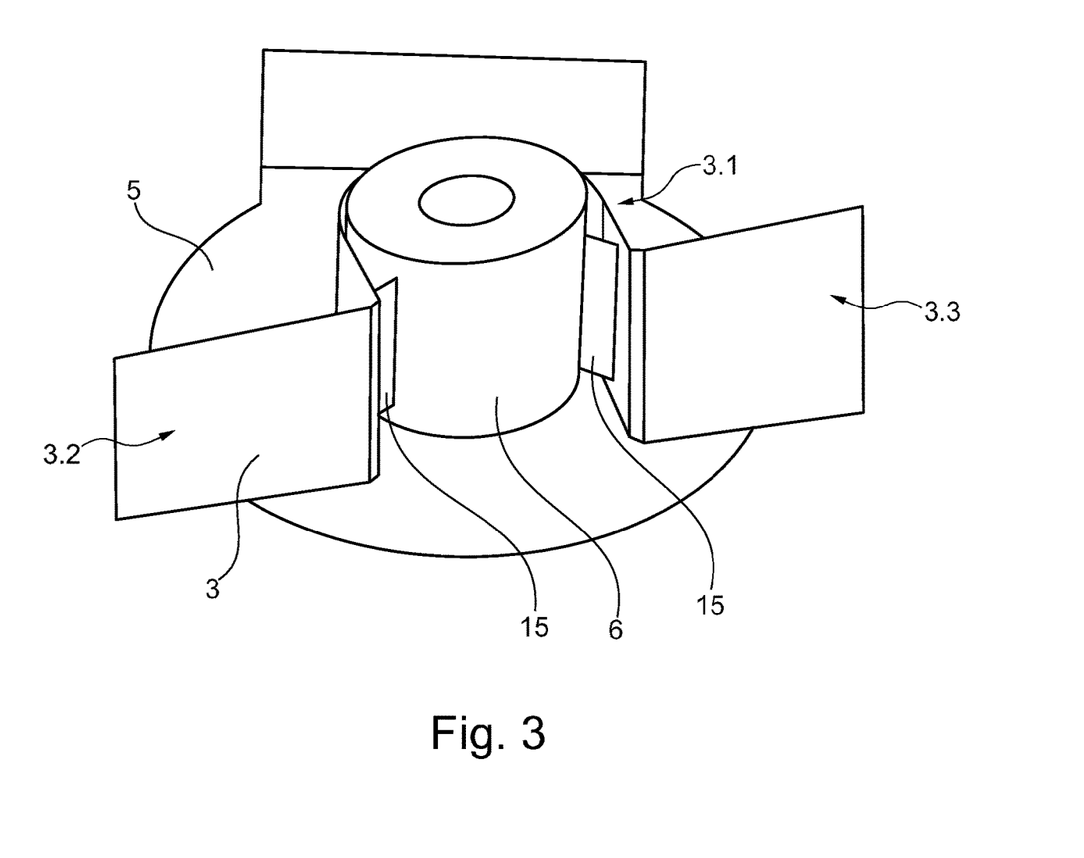
FIG. 3 a perspective depiction of elements of the rear axle suspension from FIG. 1.
Figure 5:
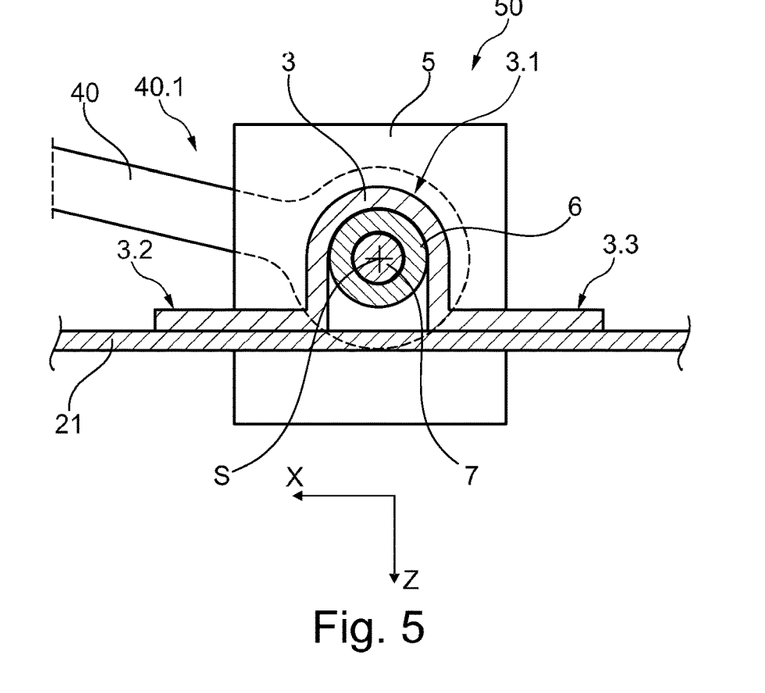
FIG. 5 a sectional depiction according to line V-V in FIG. 4.

FIG. 3 shows in perspective view elements of the first holding arrangement 2, namely the stabilizing element 3, the stop element 5 and the tubular axle receiver 6. This FIG. 3 and the sectional depiction in FIG. 5 show particularly clearly that the stabilizing element 3 is formed as a whole in an omega shape, wherein a first connecting portion 3.2 and a second connecting portion 3.3 are arranged on both sides of an arcuate portion 3.1. Since the stabilizing element 3 was made from a strip-like sheet metal blank, said three portions 3.1, 3.2, 3.3 extend in the axial direction, wherein the arcuate portion 3.1 extends in the tangential direction over a total angle of around 260° about the pivot axis S. The arcuate portion here runs parallel to the tangential direction over an angle of around 180°. The two connecting portions 3.2, 3.3 are welded to the longitudinal member 21, guaranteeing a secure connection of the stabilizing element 3.

The axle receiver 6, which in turn receives the axle pin 7, is arranged inside the arcuate portion 3.1. Said axle pin 7 is therefore mounted inside the arcuate portion 3.1. The axle receiver 6 is connected to the stabilizing element via axial weld seams 15. Forces transmitted via the axle pin 7 between the vehicle superstructure 20 and the twist-beam axle 40 act via the axle receiver 6 on the stabilizing element 3. Because of its curved structure, which extends firstly axially and secondly tangentially, this has a high stability in particular against axial forces or forces acting in the direction of the transverse axis (Y axis). It is of particular importance here that the stabilizing element 3 with its arcuate portion 3.1 is arranged to a certain extent adjacent to the pin axis S and around this, and therefore axial forces cannot exert any bending moments or only slight bending moments. The stability of the first holding arrangement 2 is further improved by the first holding element 4, which is welded firstly to the side face 21.2 and secondly by an annular weld seam 16 to the axle receiver 6 which is guided through a recess of the holding element 4.

To guarantee secure engagement between the axle pin 7, which in this case has the form of a bolt with a head 7.1 and an external thread 7.2, and the bearing receiver 6, the bearing receiver 6 has an internal thread 6.1 in which the external thread 7.2 is screwed. As evident in particular from FIG. 4, the head 7.1 of the axle pin 7 lies by form fit on the second holding element 11 of the second holding arrangement 10, while the shaft with the external thread 7.2 is guided through the second holding element 11 and the inner metal sleeve 8.1 of the bearing bush 8. The second holding element is made of a substantially thinner sheet metal than the first holding element 4 or the stabilizing element 3, and therefore in itself is flexible under axial forces. On assembly of the rear axle suspension 50, it is deformed by the axle pin 7 in targeted fashion in the direction of the connecting portion 40.1 when the external thread 7.2 is screwed into the internal thread 6.1. The low axial stability of the second holding element 11 has no adverse effect, or only an insignificant effect, on the axial stability of the entire holder 1, since axial forces are effectively absorbed by the first holding arrangement 2. In order to restrict the axial freedom of movement of the bearing bush 8 and connecting portion 40.1, the stop element 9 is provided which is welded to the axle receiver 6.

Figure 6:
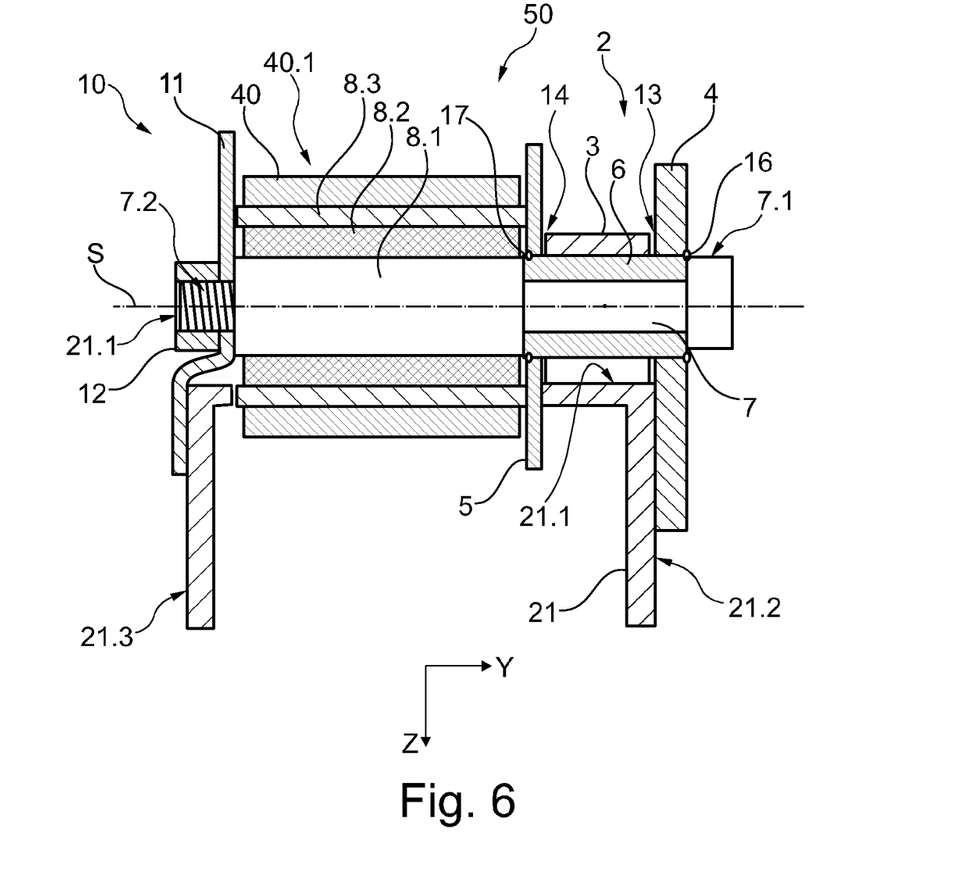
FIG. 6 a partially sectional depiction of a rear axle suspension according to the invention in a second embodiment.

FIG. 6, which shows a sectional depiction along the Y-Z plane according to FIG. 4, shows a second embodiment of a rear axle suspension 50 which in its fundamental structure resembles the embodiment shown in FIGS. 1 to 5. However, the first holding arrangement 2 here is arranged on the outside relative to the vehicle middle, while the second holding arrangement 10 is arranged on the inside. Since here again the head 7.1 of the axle pin 7 should be arranged on the outside, the axle receiver 6 is formed smooth or without a thread on the inside, while the second holding arrangement 10, in addition to the second holding element 11, has a threaded nut 12 which is welded thereto. The external thread 7.2 of the axle pin is here bolted to an internal thread 12.1 of the threaded nut 12.

Figure 7:
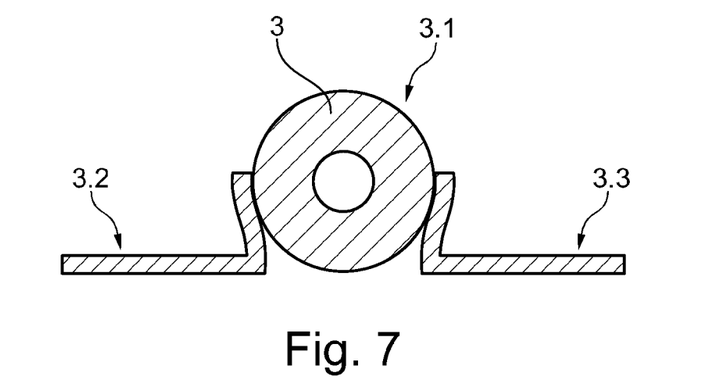
FIG. 7 a sectional depiction of a stabilizing element according to a third embodiment.

FIG. 7 shows an alternative embodiment of a stabilizing element 3 in which the arcuate portion 3.1 is first made separately from the connecting portions 3.2, 3.3 and then welded thereto. The arcuate portion 3.1 may therefore be formed completely closed all round in the tangential direction or tubular, and also its thickness may be selected greater, independently of the connecting portions 3.2, 3.3. In particular, in the present case, the dimensions of the arcuate portion 3.1 are selected such that there is no need for a separate axial receiver 6, i.e. the axle pin 7 can be mounted directly in the arcuate portion 3.1.

This disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:
1. An assembly, comprising:
   a semi-rigid axle;
   a vehicle superstructure; and
   a rear axle suspension with a holder pivotally connecting a connecting portion of the semirigid axle to the vehicle superstructure, the holder having a first and a second holding arrangement for an axle pin, the first and second holding arrangements being arranged on both sides of the connecting portion along a pin axis, the first and second holding arrangement being fixed to and stationary relative to the vehicle superstructure;
   the first holding arrangement having a first holding element and a stabilizing element with the stabilizing element between the first holding element and the semirigid axle;
   the stabilizing element having an arcuate portion and connecting portions, the arcuate portion, in the direction of the pin axis and tangentially, extending at least partially around the pin axis, the axle pin being mounted in the arcuate portion, and the connecting portions being adjacent the arcuate portion on both sides of the stabilizing element and fixed to and stationary relative to the vehicle superstructure.

2. The assembly as claimed in claim 1, wherein the first holding arrangement is on an inboard side of the rear axle suspension.

3. The assembly as claimed in claim 1, further comprising an axle receiver fixed in the arcuate portion.

4. The assembly as claimed in claim 3, wherein the axle receiver has an internal thread which cooperates with an external thread of the axle pin.

5. The assembly as claimed in claim 1, wherein the second holding arrangement has an internal thread which cooperates with the external thread of the axle pin.

6. The assembly as claimed in claim 1, wherein the stabilizing element is formed as one piece.

7. The assembly as claimed in claim 1, wherein the first holding arrangement on a side facing away from the connecting portion has a first holding element which extends transversely to the pin axis and is connected to a first side face of the vehicle superstructure and at least indirectly to the stabilizing element.

8. The assembly as claimed in claim 1, wherein the first holding arrangement on a side facing towards the connecting portion has a stop element which extends transversely to the pin axis and forms a stop for a bearing bush.

9. The assembly as claimed in claim 8, further comprising an axle receiver fixed in the arcuate portion, the first holding element and the stop element being welded to the axle receiver.

10. The assembly as claimed in claim 9, wherein the axle receiver is welded to the stabilizing element.

11. The assembly as claimed in claim 8, wherein the stop element is between the stabilizing element and the semi-rigid axle.

12. The assembly as claimed in claim 1, wherein the second holding arrangement has a second holding element which extends transversely to the pin axis and is connected to a second side face of the vehicle superstructure.

* * * * *

UNITED STATES PATENT AND TRADEMARK OFFICE
CERTIFICATE OF CORRECTION

PATENT NO. : 10,953,719 B2  
APPLICATION NO. : 15/882149  
DATED : March 23, 2021  
INVENTOR(S) : Hagen Kiehn Page 1 of 1

It is certified that error appears in the above-identified patent and that said Letters Patent is hereby corrected as shown below:

In the Claims

Column 11, Line 9, replace "claim 1" with --claim 4--

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*